July 8, 1947.  C. E. DICKERSON  2,423,690
SPRING WHEEL
Filed Oct. 8, 1943  2 Sheets-Sheet 1

INVENTOR.
C. E. Dickerson
BY
Victor J. Evans & Co.
ATTORNEYS

July 8, 1947.　　　C. E. DICKERSON　　　2,423,690
SPRING WHEEL
Filed Oct. 8, 1943　　　2 Sheets-Sheet 2
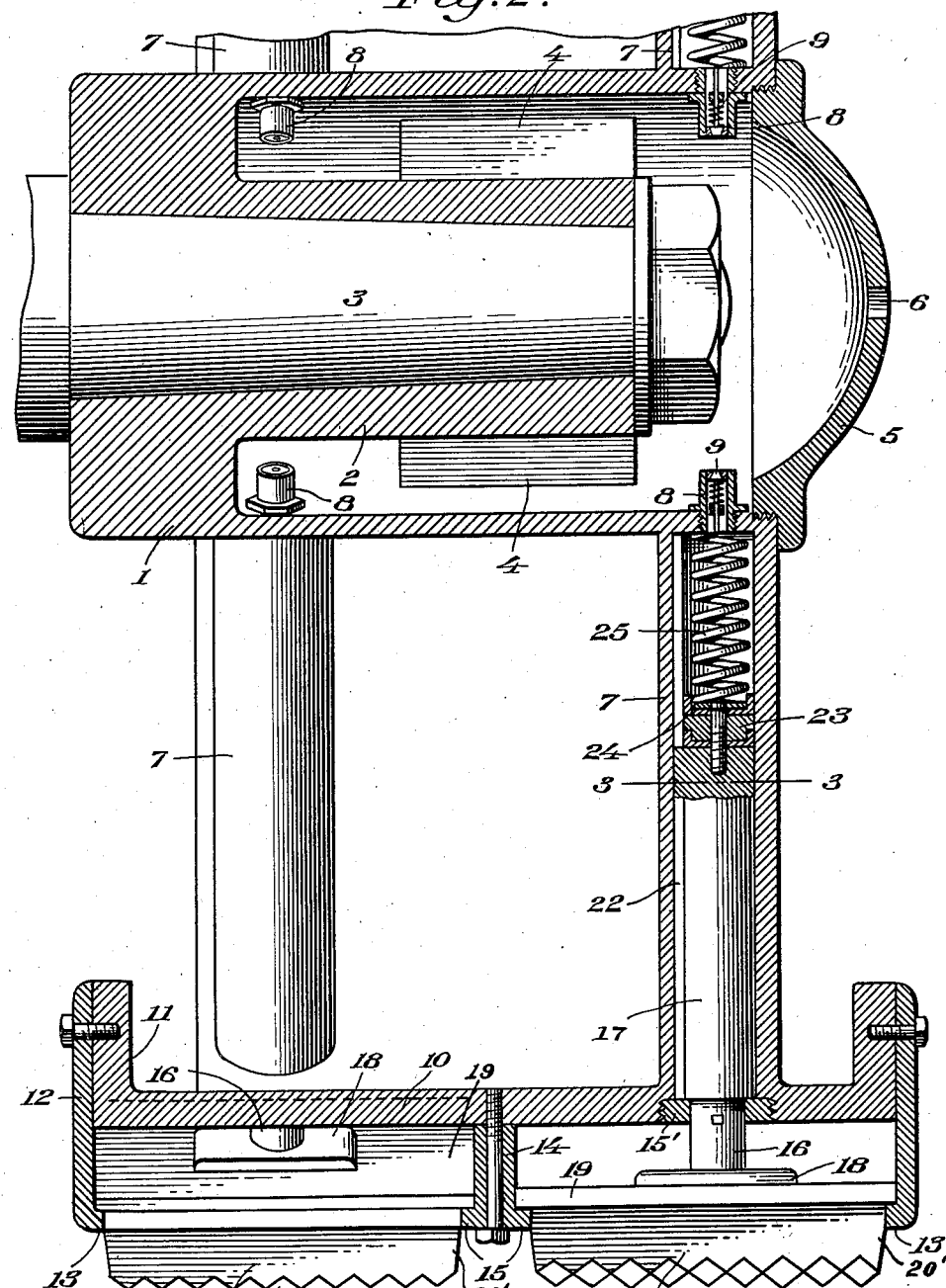
INVENTOR.
C. E. Dickerson:
BY
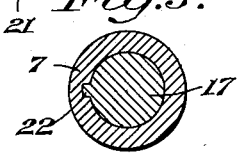
ATTORNEYS Patented July 8, 1947

2,423,690

UNITED STATES PATENT OFFICE 2,423,690

SPRING WHEEL

Charles E. Dickerson, Philadelphia, Pa.

Application October 8, 1943, Serial No. 505,542

1 Claim. (Cl. 152—6)

My present invention has reference to a vehicle wheel construction, and my object is to provide a vehicle wheel which will afford an air cushion between the axle and the road surface and thereby rendering the wheel shock-proof but affording the said wheel with the same resiliency as a pneumatic tired wheel.

A further object is the provision of a vehicle wheel in which each spoke is in the nature of a piston cylinder, the same having received therein a piston. Each piston is spring influenced in an outward direction but limited in movement in both directions and carries a tread shoe or block. There is a valve means between the hub of the wheel and the cylindrical spokes therefor and opening to admit air over the cylinders and against the pistons when the cylinders move outwardly of the pistons but to close and afford air cushions when pressure is exerted against the tread shoes carried by the pistons and thereby relieve shock to which the vehicle would be otherwise subjected, to produce the same result as that of a pneumatic tire folding resiliently over a road surface and likewise producing a wheel that is puncture-proof.

To the attainment of the foregoing and other objects which will present themselves the invention further resides in certain other novel features of construction, combination and operative association of parts, to be hereinafter described and definitely claimed.

In the drawings:

Figure 2 is a sectional view on the line 2—2 of Figure 1.

Figure 3 is a transverse sectional view on the line 3—3 of Figure 2.

Figure 1:
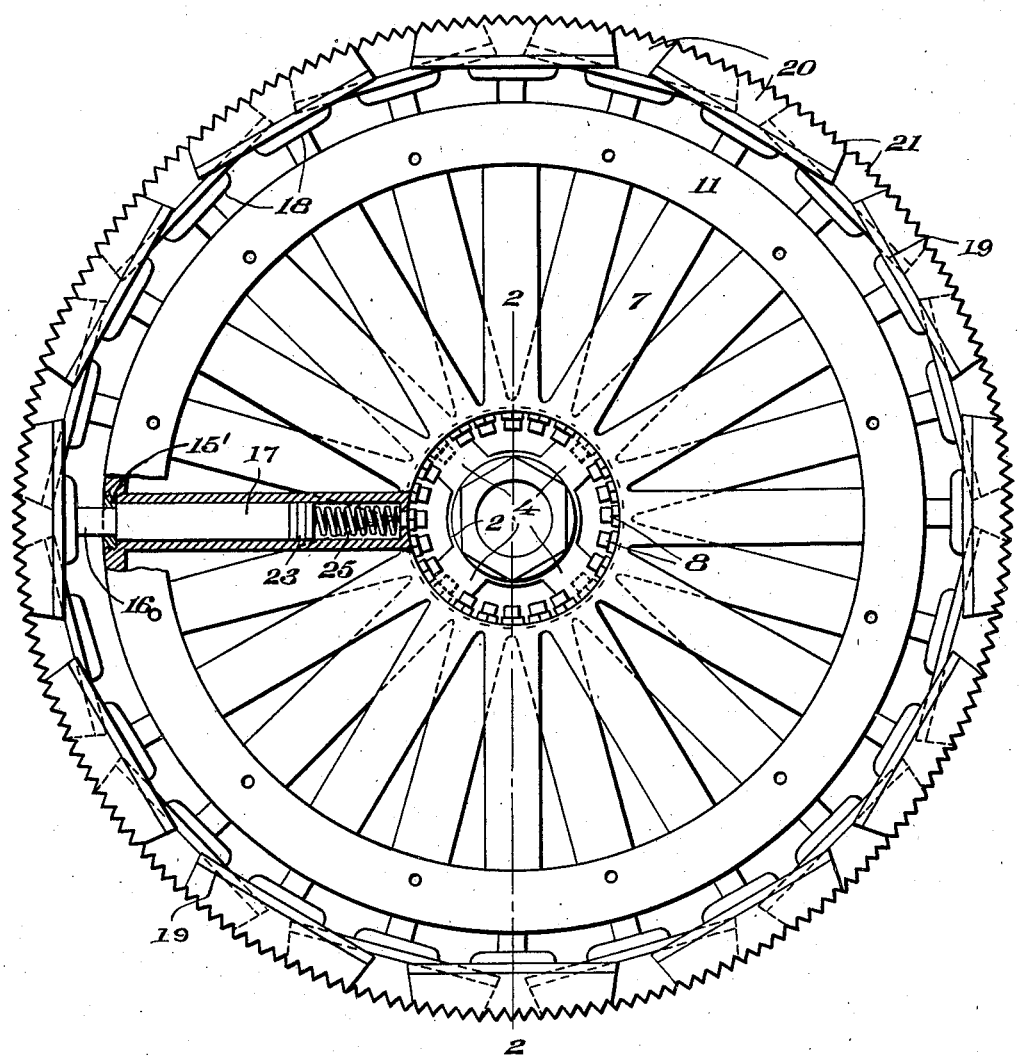
Figure 1 is a side elevation of a vehicle wheel in accordance with this invention with parts removed.
Figure 4:
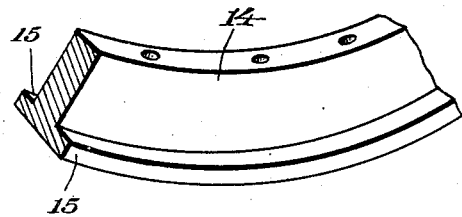
Figure 4 is a fragmentary perspective view of a ring which divides the wheel of the rim into spaced channels or compartments.

The hub I of my improved wheel is a particular and peculiar construction. The hub is wholly constructed of metal and from adjacent its inner end is centrally formed with a tubular extension 2 whose bore is flared. This extension provides the bearing for the axle spindle 3. The bearing terminates a suitable distance away from the outer end or face of the hub I so that the nut can be properly screwed upon the spindle 3 and likewise a space is afforded between the said bearing and the hub proper. The bearing is reinforced by radial ribs or webs 4 which are integrally formed on the outer face of the said bearing and on the inner wall of the hub I.

The outer end of the hub is closed by a saucer-shaped cap 5 which is screwed thereon and the said cap is centrally provided with an air inlet opening 6.

In the showing of the drawings the hub, adjacent its ends is integrally formed with spaced series of spokes 7. The spokes of one of the series are arranged intermediate of those of another series. All of the spokes are of a similar length and construction and each of the spokes is in the nature of a tubular member and, therefore, in the nature of a cylinder. The hub I has screwed therethrough, in a line with the center of each of the spokes 7, the reduced end of a valve casing 8. In each casing there is a spring influenced valve 9 that opens inwardly.

The spokes merge into the rim 10 of the wheel. In the showing of the drawings the rim 10 has its edges provided with continuous inwardly directed flanges 11 and to the outer faces of these flanges there are bolted ring plates 12 which extend a suitable distance beyond the periphery of the rim 10 and which have their ends formed with inwardly directed flanges 13.

Centrally bolted to the outer face of the rim 10 there is a ring member 14. This ring member has its outer edge formed with oppositely extending flanges 15, respectively, the said flanges being disposed opposite and in a line with the respective flanges 13 of the ring plates 12. Thus it will be noted that the plates 12 and 14 provide the rim 10 with a pair of spaced continuous chambers or compartments. While the construction as just described may be more easily attached to the rim, and perhaps will cheapen the wheel construction it is obvious that the rim 10 may be integrally formed with the spaced pairs of continous compartments.

The bores of the spokes 7 pass through the rim 10, but these ends of the spokes are closed by headless nuts 15' which are screwed in the rim. The nuts 15' receive therethrough the reduced ends 16 of piston rods 17, one of each entering the respective spokes 7. The shoulder provided between the end 16 and the piston rod proper is normally in contact with the nut 15', and the outer end of the part 16 of the piston rod is provided with a flange 18 to which is fixed the head portion 19 of a segmental tread member or section 20. The bodies 20' of the tread members are disposed laterally inwardly with respect to the heads 19 thereof so that the shoulders between the bodies and heads contact with the flanges 13 and 15 of the elements 12 and 14, respectively. The outer face of each of the tread sections 20 is preferably toothed or serrated, as indicated by the numeral 21 and also the tread sections are constructed of vulcanized rubber.

Each piston rod 17 is held from turning through the medium of a key 22 that enters a groove in the said piston rod 17. Each piston rod has fixed on its inner end a piston 23. The piston preferably comprises cup-washers, spacer elements between the cup washers, a disc or the outer cup washer and a bolt which passes through the disc and the elements comprising the piston. The cup washers are in frictional contact with the bore of the cylindrical spokes 7 and arranged in each of the spokes 7 and contacting with the metal outer washer 24 on the piston 23 and with the hub 1 there is a comparatively strong helical spring 25. The springs 25 will urge the pistons outwardly through the cylindrical spokes 7 and such movement of the pistons will cause the openings of the valves 9 to draw air through the valve casings 8 into the spokes. When the successive tread members 20 are brought into ground contacting engagement the pistons 23 will compress the air in the cylindrical spokes and such air acts as a cushion which will prevent the wheel being subjected to undue shocks.

The device not only provides an air cushion between the road surface and the axle of a machine but as previously stated produces the same result as that of a pneumatic tire and the device is puncture-proof.

Obviously in lieu of arranging the air inlet valves 9 between the hub and the hollow spokes, such valves or similar inwardly opening valves may be connected directly to the spokes for the passage of atmospheric air when the pistons are depressed or moved outwardly under the influence of the springs 25.

Having described the invention, I claim:

A wheel of the class described having a hub, said hub having spaced series of hollow spokes extending therefrom, a rim surrounding the hub and to which the spokes are connected, removable ring plates on the sides of the rim having their outer edges formed with inwardly directed flanges, a central ring member fixed on the rim and having its outer edge provided with laterally extending flanges, a piston rod in each spoke and having a reduced end extending therethrough, a flange on said reduced end, a nut screwed in the rim and arranged around the reduced end of each piston rod, a segmental tread member on the said flange of each piston rod having a flanged head to be engaged by the flanges of the ring plates, a piston on the inner end of each rod, a spring in each spoke exerting a pressure against the piston for urging the piston rods outwardly through the spokes, an inwardly opening spring influenced air valve between the inner wall of the hub and each piston and coengaging means between the piston rods and the hollow spokes for holding the piston rods from turning.

CHARLES E. DICKERSON.

REFERENCES CITED

The following references are of record in the file of this patent:

UNITED STATES PATENTS

| Number | Name | Date |
|---|---|---|
| 1,630,865 | Schultz | May 31, 1927 |
| 1,139,164 | Clement | May 11, 1915 |
| 1,023,516 | Guest | Apr. 16, 1912 |
| 1,051,236 | Johnston | Jan. 21, 1913 |
| 788,034 | Fasey | Apr. 25, 1905 |
| 997,302 | Langford | July 11, 1911 |
| 1,045,485 | West | Nov. 26, 1912 |
| 816,666 | Kimball | Apr. 3, 1916 |